(12) United States Patent
Syed et al.

(10) Patent No.: US 7,206,954 B2
(45) Date of Patent: Apr. 17, 2007

(54) REDUCED POWER CONSUMPTION FOR EMBEDDED PROCESSOR

(75) Inventors: Masood U. Syed, Los Angeles, CA (US); Yuqian C. Wong, San Diego, CA (US); Brima B. Ibrahim, Los Angeles, CA (US); Mitchell A. Buznitsky, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 217 days.

(21) Appl. No.: 10/361,464

(22) Filed: Feb. 10, 2003

(65) Prior Publication Data

US 2004/0158750 A1    Aug. 12, 2004

(51) Int. Cl.
*G06F 1/32* (2006.01)

(52) U.S. Cl. .............. 713/324; 713/300; 713/320; 327/544

(58) Field of Classification Search ................ None
See application file for complete search history.

(56) References Cited

U.S. PATENT DOCUMENTS

| | | | |
|---|---|---|---|
| 5,844,817 A * | 12/1998 | Lobley et al. ............... 703/2 |
| 6,085,268 A * | 7/2000 | Lee et al. ..................... 710/72 |
| 6,434,704 B1 * | 8/2002 | Dean et al. .................. 713/320 |
| 6,622,250 B1 * | 9/2003 | Castillo et al. .............. 713/300 |
| 6,711,691 B1 * | 3/2004 | Howard et al. .............. 713/300 |
| 6,792,551 B2 * | 9/2004 | Dai .............................. 713/320 |

\* cited by examiner

*Primary Examiner*—James K. Trujillo
*Assistant Examiner*—Anand B. Patel
(74) *Attorney, Agent, or Firm*—Garlick Harrison Markison; Robert McLauchlan

(57) ABSTRACT

An embedded processor system including at least one gated power unit including an internal ROM and a power controller that provides one or more gated power signals to selectively provide power to each gated power unit. The power controller provides a gated clock signal to the embedded processor to selectively control power consumption of the processor. The power controller powers down each gated power unit after freezing the processor and then powers up each gated power unit before reactivating the processor. The embedded processor system may include isolation circuitry, such as clamp circuitry or the like, that is operative to minimize current flow into each gated power unit when powered down. The gated power units may include a static function. The ROM of an embedded ROM-based microprocessor system is powered down when the microprocessor is idle to reduce or otherwise eliminate intrinsic leakage.

17 Claims, 9 Drawing Sheets

REDUCED POWER CONSUMPTION FOR EMBEDDED PROCESSOR

BACKGROUND

1. Technical Field

The present invention relates generally to power conservation; and more particularly to an embedded processor system with selective power control to an internal device including a non-volatile memory array.

2. Description of Related Art

Power management is an important consideration for electronic devices, particularly more sophisticated battery-powered electronic devices. Examples of such applications include, but are not limited to, mobile handsets, smart phones, personal digital assistants (PDAs), automotive Telematic systems, point of sale (POS) input devices, remote controls, remote sensors, laptop personal computers, and computer peripheral devices. Exemplary computer peripheral devices include, but are not limited to, PCMCIA cards, CF cards, USB dongles, wireless keyboards, wireless pointing devices, wireless mice, wireless trackballs, game controllers and joysticks. Many such devices require processing capabilities and wireless communications and incorporate system-on-chip (SOC) designs or the like. The processing and wireless communication functions consume substantial amounts of power significantly reducing battery life. Designers are faced with the trade-off of providing adequate functionality particularly for devices intended for direct human interface, while minimizing power consumption such as in order to sustain a reasonable battery life.

As SOC designs grow in complexity, it becomes more difficult to achieve very low power consumption. Simple clock gating in very large designs still leaves an integrated circuit (IC) with intrinsic leakage simply due to the physical design of the transistors. Even though this leakage current is very small, the combined effect of hundreds of thousands to millions of transistors can cause a small battery to drain in a short period of time.

Thus, there is a need in the art for power management for SOC and IC designs to maximize battery life.

SUMMARY OF THE INVENTION

Thus in order to overcome the shortcomings of the prior devices among other shortcomings, an embedded processor system according to an embodiment of the present invention includes at least one gated power unit which further includes an embedded non-volatile memory array, and a power controller that receives power via a system power signal and that provides one or more gated power signals to selectively provide power to each gated power unit. The power controller may further receive a system clock signal and provide a gated clock signal to an embedded processor to selectively control power consumption of the processor. The power controller may power down each gated power unit after freezing the processor and then powering up each gated power unit before re-activating the processor. The embedded processor system may include isolation circuitry that is operative to minimize current flow into each gated power unit when powered down. The gated power units may include a static function which receives gated power in a similar manner as the non-volatile memory array.

An integrated circuit according to an embodiment of the present invention includes an embedded microprocessor, a read-only memory (ROM) having a power input, and a power control unit that receives power via a system voltage signal and that provides a gated power signal to the power input of the ROM to selectively power up and power down the ROM.

A method of saving power in an embedded processor system having an embedded processor and an internal ROM according to an embodiment of the present invention includes selectively providing power to the ROM via a gated power signal, and removing power from the ROM while the processor is in idle mode. The method may include providing a gated clock signal to the processor, placing the processor in idle mode by placing the gated clock signal in a static state, and removing power from the ROM after the processor is placed in idle mode. The method may include reactivating the processor by activating the gated clock signal, and, before activating the gated clock signal, providing power to the ROM via the gated power signal. The method may include minimizing current flow into the ROM while powered down. The minimizing current flow while the ROM is powered down may include clamping its inputs and isolating its outputs. The method may include selectively providing power to other portions of the system, such as static functions or the like.

Moreover, other aspects of the present invention will become apparent with further reference to the drawings and specification, which follow.

DETAILED DESCRIPTION OF THE DRAWINGS

Figure 1:
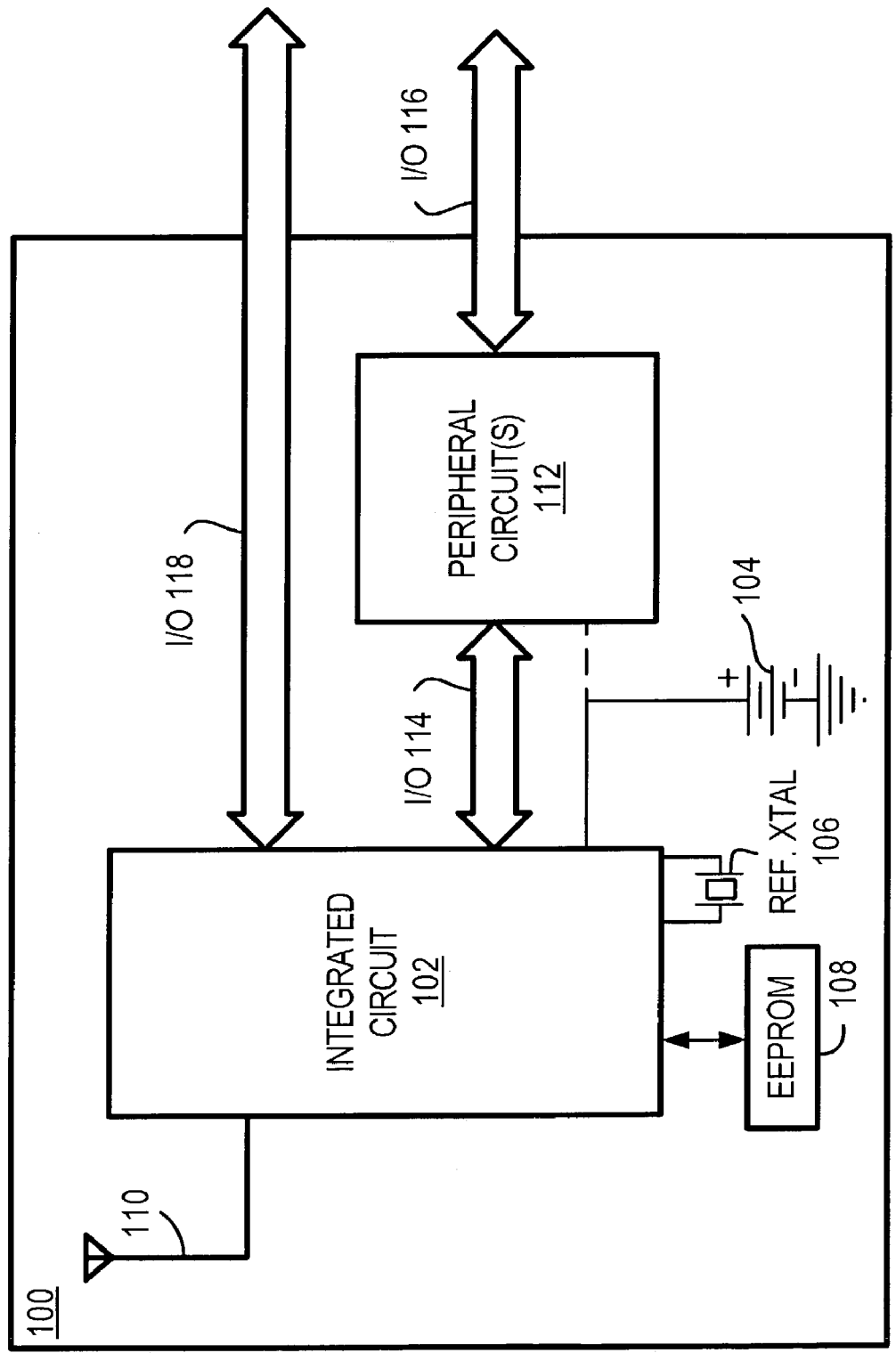
FIG. 1 is a simplified block diagram of a wireless electronic device implemented according to an embodiment of the present invention.

FIG. 1 is a simplified block diagram of a wireless electronic-device 100 implemented according to an embodiment of the present invention. The configuration illustrated is generalized in that it represents any one of several different types of devices, such as, for example, a mobile handset, a smart phone, a PDA, an automotive telematic system, a POS input device, a remote control or remote sensor, a laptop PC, or any one of several different types of computer peripheral devices. Exemplary computer peripheral devices include, but are not limited to, PCMCIA cards, CF cards, USB dongles, wireless keyboards, wireless pointing devices, wireless mice, wireless trackballs, game controllers and joysticks.

The wireless electronic device 100 includes an integrated circuit (IC) 102 implemented according to an embodiment of the present invention. The IC 102 couples to a power source 104, a reference crystal (Ref. Xtal) 106 that produces a desired reference frequency (e.g. 12 Megahertz), an EEPROM 108, and an antenna 110. The EEPROM 108 is provided for storing configuration data and may be replaced by any other type of non-volatile memory device, such as Flash memory or random access memory (RAM) or the like. Any suitable power source 104 is contemplated, such as chargeable or non-rechargeable batteries (e.g., a pair of either AA batteries or AAA batteries) or any suitable regulated or unregulated power supply. The antenna 110 may be an internal or external antenna depending upon the type and size of electronic device. For example, an internal antenna is contemplated for PC Cards, wireless mice, wireless keyboards, etc. The wireless electronic device 100 further includes a peripheral circuit 112 coupled to the IC 102 via an appropriate Input/Output (I/O) interface 114. Depending upon the type of device, the peripheral circuit 112 may be coupled to the power source 104 as indicated by a dashed line. Additional interfaces are contemplated, such as an I/O interface 116 enabling external access to the peripheral circuit 112 and/or an I/O interface 118 enabling external access to the IC 102.

The implementation of the peripheral circuit 112 and the existence and configuration of the I/O interfaces 114, 116 and 118 depend upon the type of wireless electronic device 100. For a wireless mouse, for example, the peripheral circuit 112 and I/O interface 114 comprise components and signals to implement x-axis and y-axis inputs known as "quadrature" inputs, a scroll input, and button inputs. The peripheral circuit 112 represents optical and/or mechanical devices commonly found on a computer mice to detect physical manipulations and to generate the appropriate input signals. For a wireless keyboard, for example, the peripheral circuit 112 may incorporate a key scan matrix (not shown) that provides inputs from the keyboard (not shown) and corresponding indicators (not shown) that are lit on the keyboard, such as indicating numbers, capitals, scroll lights, etc. Similar configurations are known for other pointing devices, such as trackballs or the like, and other peripheral devices, such as game controllers, joysticks, POS input devices, remote controls and sensors, etc. Also, combinations are contemplated, such as the case in which the IC 102 services both mouse and keyboard input and may reside internal to either the mouse of the keyboard with multiplexing or signal sharing functions.

The peripheral circuit 112 may represent more complex circuitry, such as representing the components and circuitry of mobile handsets, smart phones, PDAs, and even laptop PCs. The present disclosure primarily concerns the implementation of the IC 102 used to perform wireless interface and communication functions.

Figure 2:
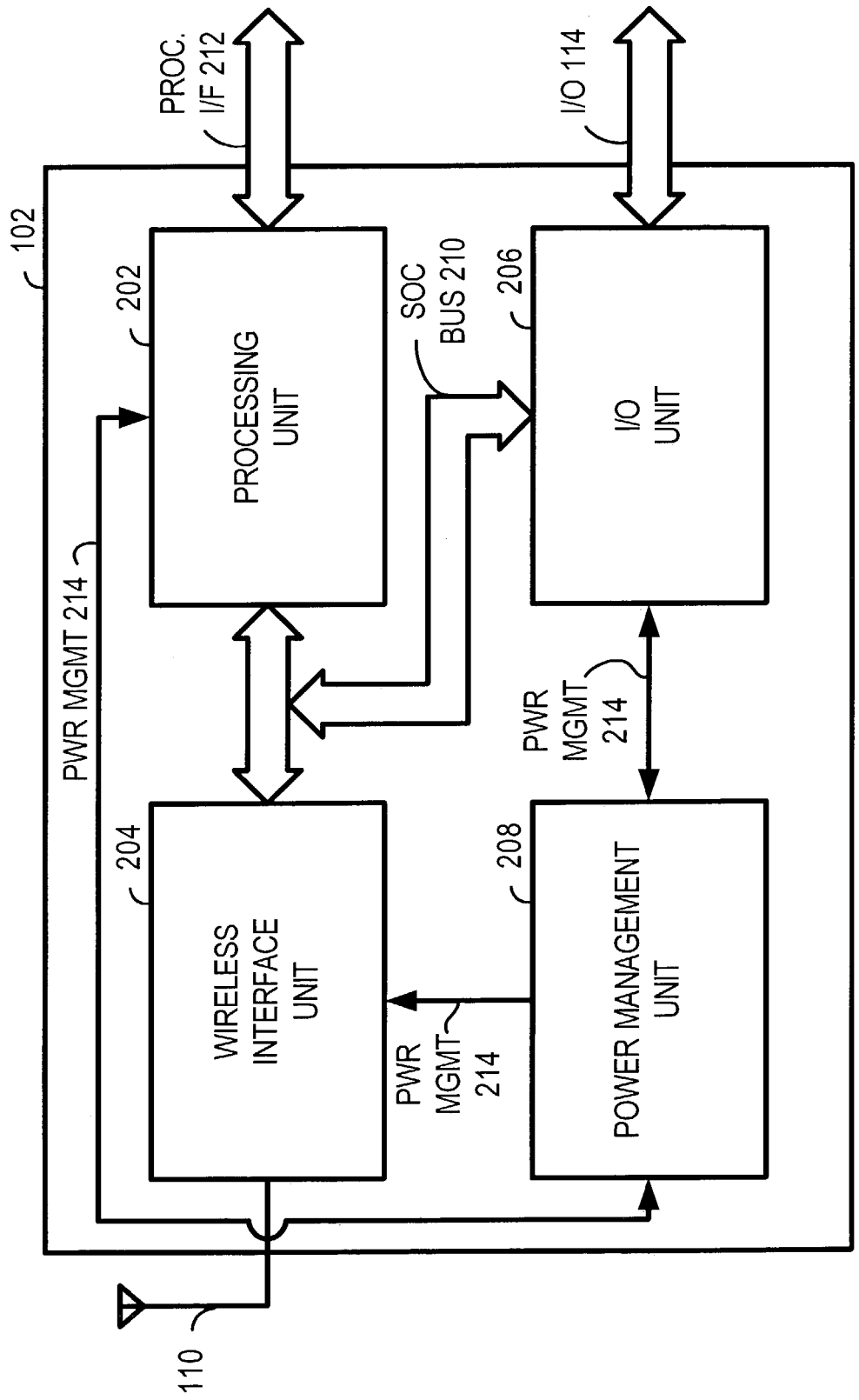
FIG. 2 is a more detailed block diagram of an exemplary embodiment of the integrated circuit of FIG. 1.

FIG. 2 is a more detailed block diagram of an exemplary embodiment of the IC 102. In this configuration, the IC 102 includes a processing unit 202, a wireless interface unit 204, an I/O unit 206, and a power management unit 208. The wireless interface unit 204 couples the IC 102 to the antenna 110. The wireless interface unit 204 operates according to any desired wireless protocol, such as the Bluetooth specification. In a more specific embodiment, the wireless interface unit 204 operates according to the Human Interface Device (HID) portion of the Bluetooth specification. The processing unit 202, the wireless interface unit 204, and the I/O unit 206 are coupled together via a system on a chip (SOC) bus 210. The processing unit 202 includes a processing interface 212 that may be used to couple the processing unit 202 to one or more peripheral devices. The I/O unit 206 interfaces the peripheral circuit 112 via the I/O interface 114. The power management unit 208 is coupled to the processing unit 202, the wireless interface unit 204, and the I/O unit 206 via a power management interface 214.

Figure 3:
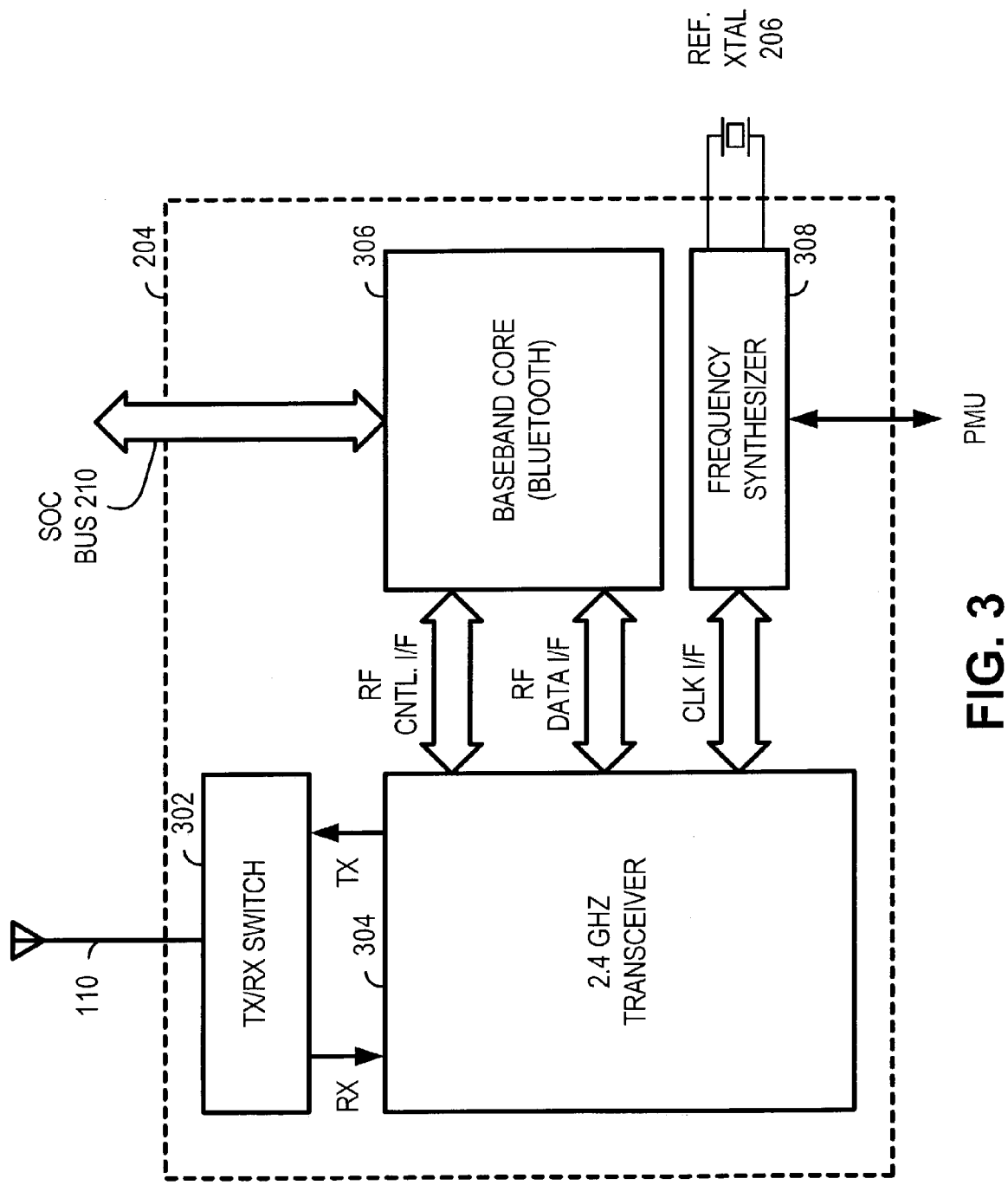
FIG. 3 is a more detailed block diagram illustrating an exemplary embodiment of the wireless interface unit for a Bluetooth configuration.

FIG. 3 is a more detailed block diagram illustrating an exemplary embodiment of the wireless interface unit 204 for a Bluetooth configuration. The wireless interface unit 204 includes a transmit/receive switch 302, a 2.4 GHz transceiver 304, a Bluetooth core 306, and a frequency synthesizer 308. Each of these components is generally known in the field and are not described in detail herein. The transmit/receive switch 302 couples to antenna 110 and switches between transmit and receive operations. The 2.4 GHz transceiver 304 performs all radio frequency (RF) front-end operations and operates within a frequency band and on particular channels as are specified by the Bluetooth operating standard. The 2.4 GHz transceiver 304 couples to baseband core 306, which in the particular embodiment shown is a Bluetooth baseband core. Such coupling is performed via an RF control interface and an RF data interface. The RF control interface performs the necessary control operations to ensure that the 2.4 GHz transceiver 304 and the baseband core 306 operate consistently with desired operating specifications. The RF data interface transfers both Rx and Tx data between the 2.4 GHz transceiver 304 and the baseband core 306. The frequency synthesizer 308 couples to the power management unit 208, to the crystal 106, and to the 2.4 GHz transceiver 304. The frequency synthesizer 308 is controlled to provide an RF frequency for the 2.4 GHz transceiver 304, which is used to mix with the baseband signal received from the baseband core during a transmit operation and to mix with the received RF signal during a receive operation. The baseband core 306 couples to other wireless interface devices via the SOC bus 210.

Figure 4:
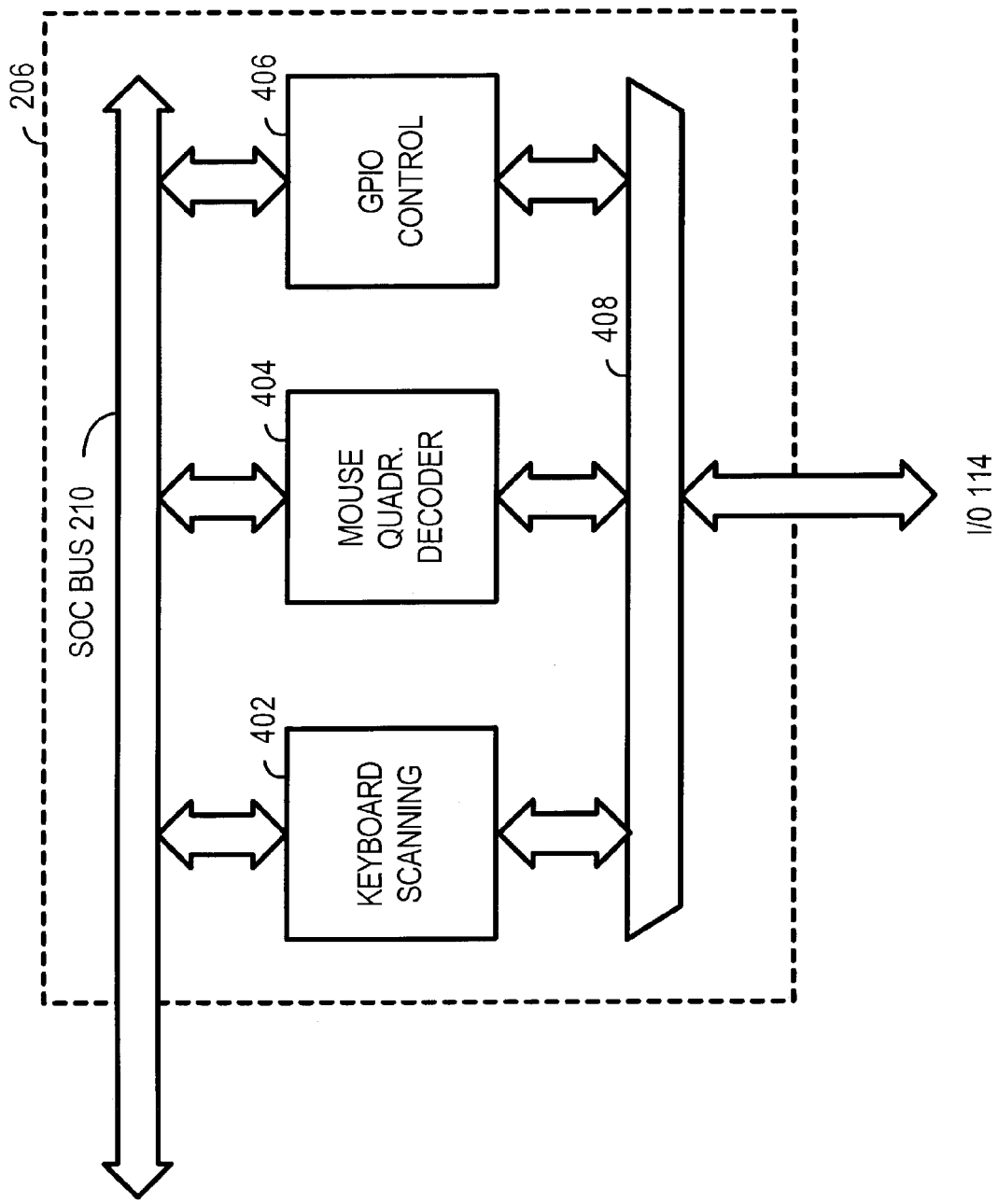
FIG. 4 is a block diagram illustrating one exemplary embodiment of the I/O unit of FIG. 2 when implemented to support wireless input devices for computers.

FIG. 4 is a block diagram illustrating one exemplary embodiment of the I/O unit 206 of the IC 102 when implemented to support wireless input devices for computers. In this case, the I/O unit 206 includes a keyboard scanning block 402, a mouse quadrature decoder block 404, and a GPIO control block 406. Each of the keyboard scanning block 402, the mouse quadrature decoder block 404, and the GPIO control block 406 couple to the SOC bus 210. Further, each of the keyboard scanning block 402, the mouse quadrature decoder block 404, and the GPIO control block 406 couple to the I/O bus 114 via a multiplexer 408, which may be coupled to the at least one user input device. In another embodiment of the I/O unit 406, each of the keyboard scanning block 402, the mouse quadrature decoder block 404, and the GPIO control block 406 each couple directly to external pins that couple to the at least one user input device.

Figure 5:
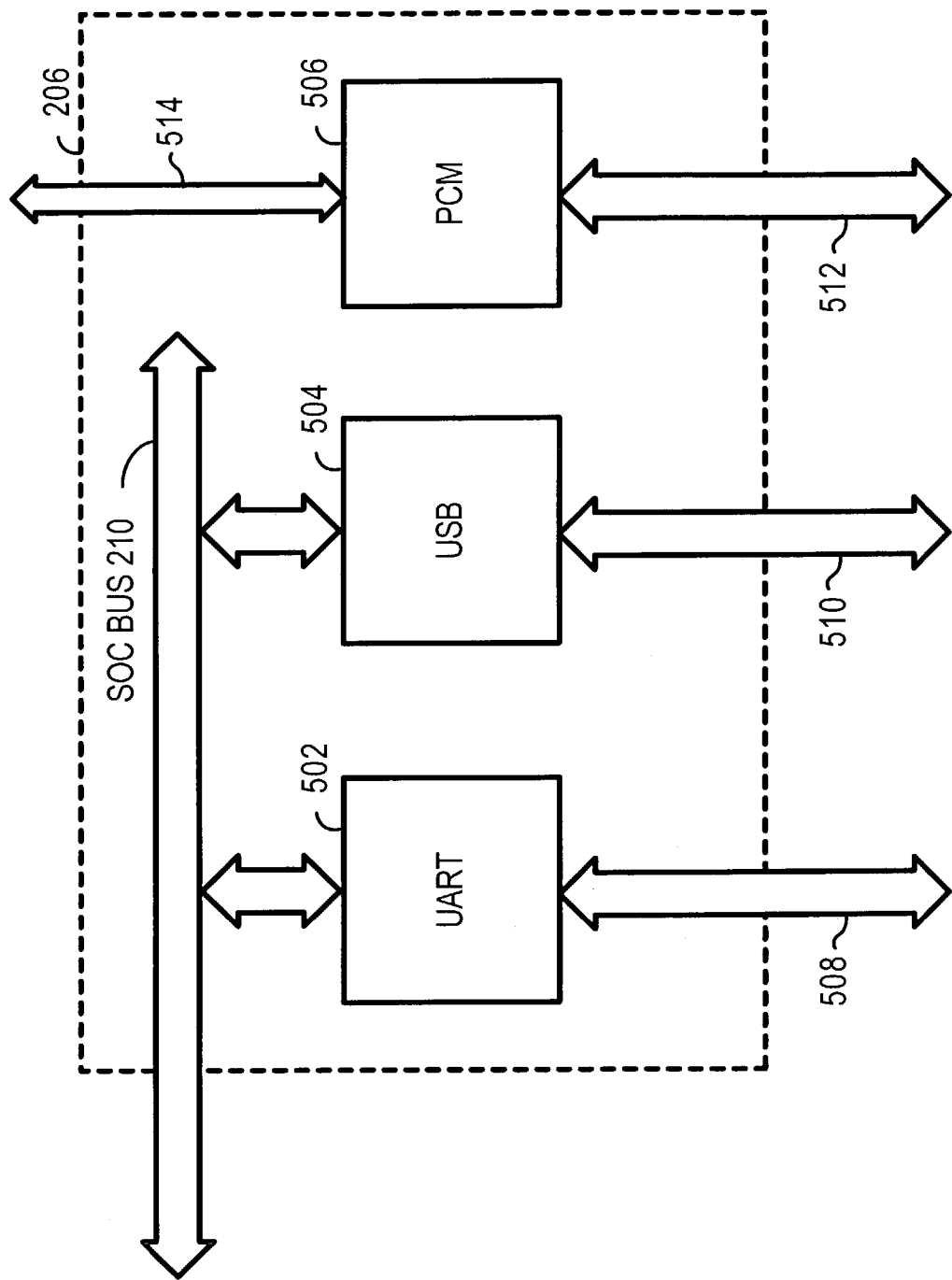
FIG. 5 is a block diagram illustrating an exemplary embodiment of an alternative of the I/O unit of FIG. 2 implemented as a peripheral transport unit (PTU)

FIG. 5 is a block diagram illustrating an exemplary embodiment of an alternative of the I/O unit 206 implemented as a peripheral transport unit (PTU). This embodiment is useful for voice and/or data applications, such as mobile handsets, smart phones, PDAs, PCs, Automotive Telematic systems, and certain computer peripheral devices, such as PCMCIA cards, CF cards USB dongles, etc. In this case, the I/O unit 206 includes a Universal Asynchronous Receiver-Transmitter (UART) unit 502, a Universal Serial Bus (USB) unit 504 and a Pulse Code Modulation (PCM) unit 506. In the configuration shown, the UART unit 502 is coupled to the SOC bus 210 and provides a physical interface to a UART interface 508. The USB unit 504 is coupled to the SOC bus 210 and is an on-chip transceiver providing an interface to a USB 510. The PCM unit 506 supports a PCM interface 512 for connection to PCM codec devices or the like for digitizing analog information, such as audio data. In the embodiment shown, the PCM unit 506 is coupled to the Bluetooth core 306 via a separate core interface 514, representing embodiments in which the PCM unit 506 is more tightly coupled to core functions to ensure quality of service (QoS) requirements for audio functions.

Figure 6:
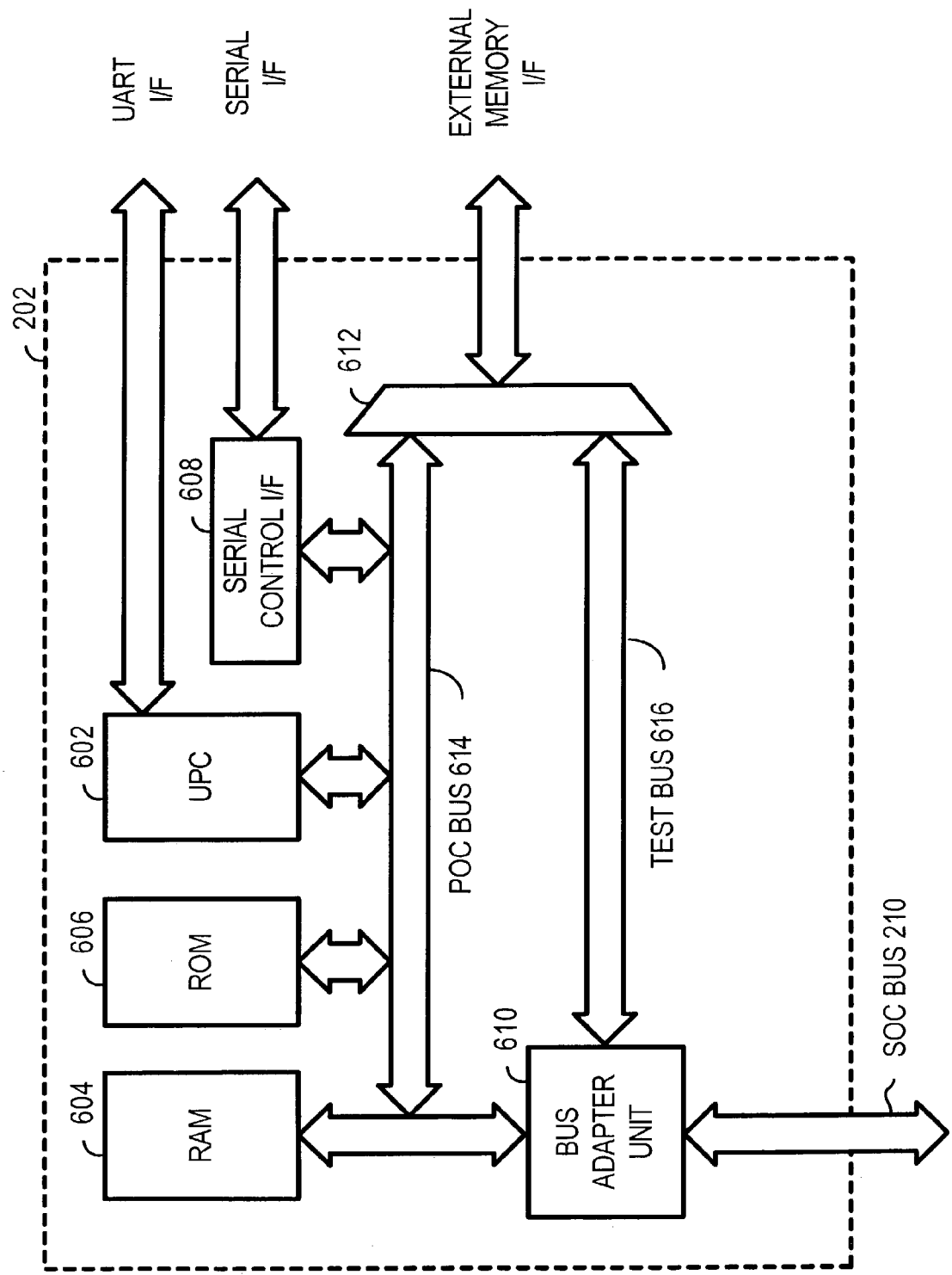
FIG. 6 is a block diagram illustrating an exemplary embodiment of the processing unit of FIG. 2.

FIG. 6 is a block diagram illustrating an exemplary embodiment of the processing unit 202 of the IC 102. The processing unit 202 includes a microprocessor core (UPC) 602, a non-volatile memory array shown as read-only memory (ROM) 606, a volatile memory array shown as RAM 604, a serial control interface 608, a bus adapter unit 610, and a multiplexor (MUX) 612. It is appreciated that although the UPC 602 is referred to as a microprocessor core, any type of processing device or processor is contemplated. The UPC 602 and the ROM 606 are embedded within the processor unit 202 of the IC 102. The UPC 602, ROM 606, RAM 604, serial control interface 608, bus adapter unit 610, and multiplexor 612 couple via a processor on a chip (POC) bus 614. The multiplexor 612 multiplexes an external memory interface between the POC bus 614 and a test bus 616. The bus adapter unit 610 interfaces the POC bus 614 with the SOC bus 210. The UPC 602 includes a UART interface that allows direct access to the UPC 602. Further, the serial control interface 608 provides a serial interface path to the POC bus 614.

Figure 7:
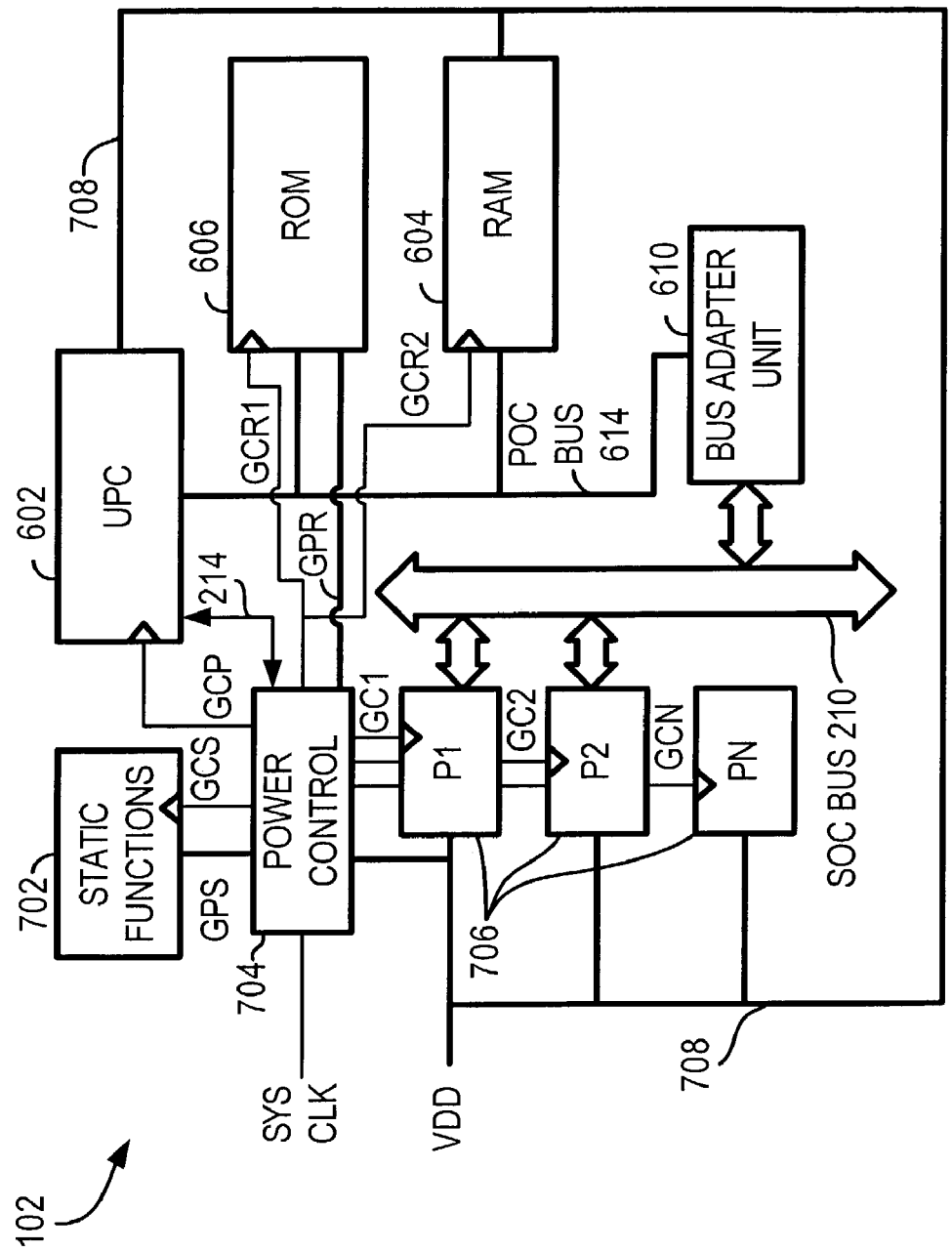
FIG. 7 is a block diagram illustrating applicable portions of the IC 102 for purposes of illustrating an embodiment of the present invention.

FIG. 7 is a block diagram illustrating applicable portions of the IC 102 for purposes of illustrating an embodiment of the present invention. The UPC 602, RAM 604, ROM 606, and bus adapter unit 610 are all shown coupled together via the POC bus 614. The SOC bus 210 is shown coupled to the bus adapter unit 610 and to one or more peripheral units 706. The peripheral units 706 are individually shown as P1, P2, . . . , PN, where "N" may be zero or any positive integer. The peripheral units 706 represent any one or more of the I/O devices previously described, including the keyboard scanning block 402, the mouse quadrature decoder block 404, the GPIO control block 406, the UART unit 502, the USB unit 504 or the PCM unit 506, which may or may not be coupled via the SOC bus 210. For example, the peripheral unit PN may be the PCM unit 506. The IC 102 also includes one or more static functions, collectively shown as static functions 702. The IC 102 further includes a power control unit 704, comprising a portion of the power management unit 208 and coupled to the UPC via the power management interface 214. A supply voltage signal VDD for the IC 102 is distributed via a power bus 708 to the power control unit 704, to the peripheral units 706, to the RAM 604, and to the UPC 602. These devices directly coupled to the power bus 618 form a "directly powered domain" including units that are always powered on when power is being supplied via the VDD signal. A system clock signal "SYS CLK" distributed on the IC 102 is provided to the power control unit 704.

The power control unit 704 controls power consumption of selected devices on the IC 102 using a clock gating scheme and a power gating scheme. The clock gating scheme enables the power control unit 704 to selectively reduce and/or stop corresponding clock signals to selected units on the IC 102 to conserve power. In the embodiment shown, the power control unit 704 provides a gated clock signal "GCS" to a clock input of the static functions 702, a gated clock signal "GCP" to a clock input of the UPC 602, a gated clock signal "GCR1" to a clock input of the ROM 606, a gated clock signal "GCR2" to a clock input of the RAM 604, a gated clock signal "GC1" to a clock input of the first peripheral device P1, a gated clock signal "GC2" to a clock input of the second peripheral device P2 and so on up to a final gated clock signal "GCN" to a clock input of the last peripheral device PN.

The power control unit 704 controls each gated clock signal collectively and/or individually to control power consumption. Each gated clock signal is derived from or otherwise a gated version of the SYS CLK signal or is set to a static state or level, e.g., logic zero, to place the corresponding unit in standby or idle mode. For example, the power control unit 704 may forward a clock signal via the signal GCP that is substantially similar to the SYS CLK signal to the UPC 602 at the same frequency for full power mode, or at a reduced frequency for a lower power mode, or at a static level for an idle mode. The same is true for the GCS, GCR1, GCR2, GC1, GC2 and GCN signals. In this manner, the power control unit 704 puts the processor unit 202 in a reduced power or idle mode by setting each of the gated clock signals to a static level. This relatively simple clock-gating scheme is employed to freeze the UPC 602 in such a manner that no instructions are lost and no special power-down instruction need be executed by the UPC 602. It is appreciated, for example, that the UPC 602, the RAM 604, the static functions 702 and the peripheral devices 706 are still powered up as being part of the "directly powered domain" and may be placed back in active mode by restoring the respective gated clock signals.

The clock gating scheme employing the gated clock signals still results in intrinsic leakage simply due to the design of the transistors of any powered devices. The ROM 606 and the static functions 702 are removed from the "directly powered domain" and placed into a "gated power domain." In particular, the ROM 606 and the static functions 702 are not directly coupled to the VDD signal, but instead derive power from the power control unit 704 via corresponding gated power signals GPR and GPS, respectively. In particular, the power control unit 704 selectively asserts supply current from the power bus 708 to the ROM 606 and the static functions 702 via the GPR and GPS signals, respectively. In a ROM-based processor system, the memory arrays can make up a significant percentage of the total transistor count. The RAM 604 may contain valid data and should remain powered. The ROM 606, however, does not need to be powered up when it is not being used. For example, when the UPC 602 is placed in idle mode or otherwise inactive, such as via the GCP signal from the power control unit 704, the power to the ROM 606 is removed by removing the supply voltage from the GPR signal, which reduces or otherwise eliminates any transistor leakage in the ROM 606. Since the power control is managed by a separate subsystem, the power to the ROM 606 may be restored instantaneously, such as just before the UPC 602 is restarted.

The static functions 702 do not contain storage elements whose contents must be maintained, and so it may also be selectively powered down by the power control unit 704 by removing supply voltage from the GPS signal in a similar manner. The static functions 702 may include, for example, logic circuitry and electronic components and the like that need not be powered up when the UPC 602 is placed in idle mode. The static functions 702 may include storage elements, such as registers or the like, so long as the stored information is not necessary for proper operation when the UPC 602 is re-activated, since any stored information in the static functions 702 is lost when powered down by the power control unit 704.

Figure 8:
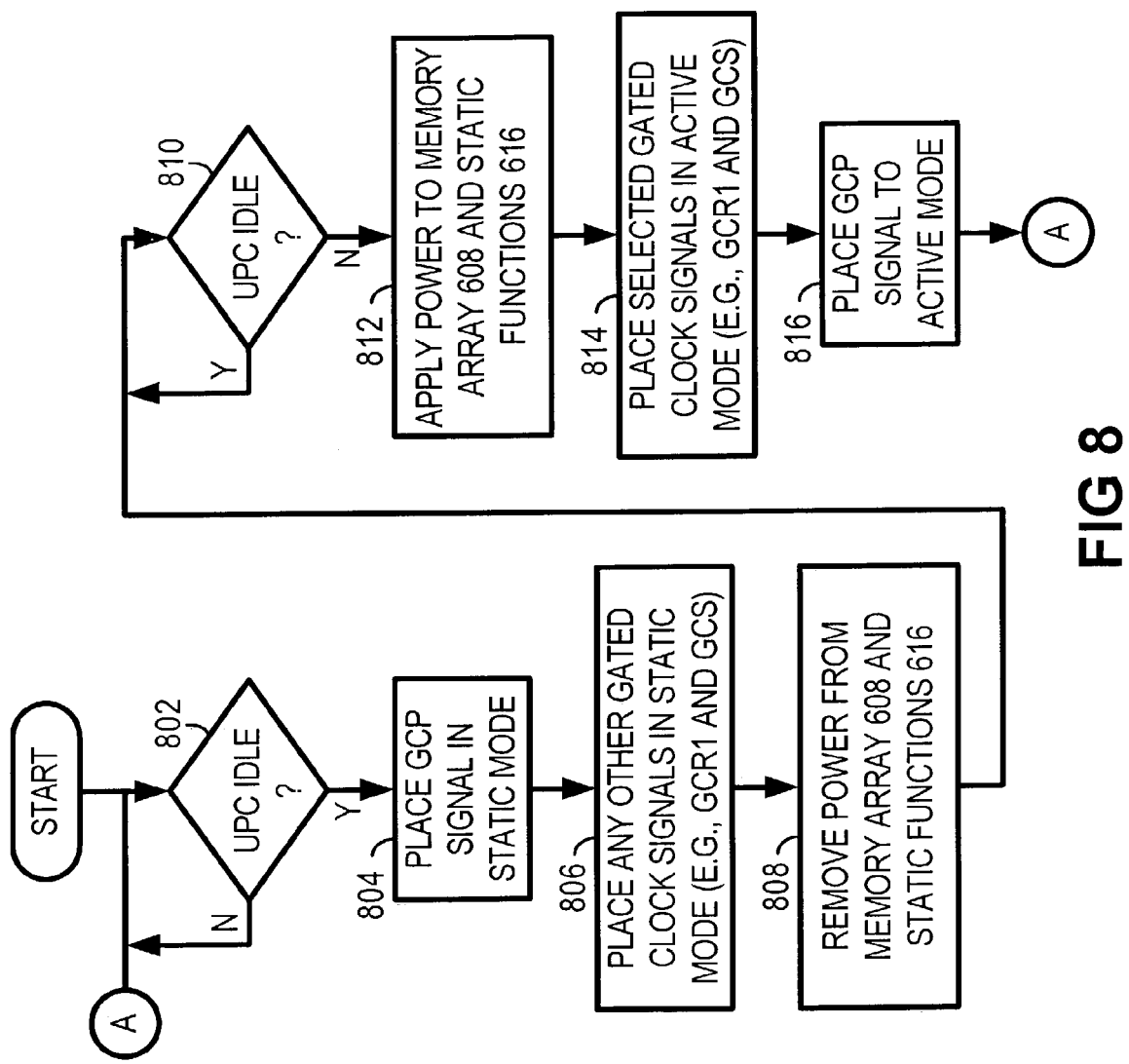
FIG. 8 is a flowchart diagram illustrating an exemplary procedure performed by the power control unit of FIG. 7 to place the UPC of FIG. 6 in idle mode.

FIG. 8 is a flowchart diagram illustrating an exemplary procedure performed by the power control unit 704 to place the UPC 602 in idle mode. In one embodiment, the power control unit 704 is configured by the UPC 602, such as via the power management interface 214, to turn off clocks to different blocks or to the entire IC 102 at certain times for certain durations. The UPC 602 similarly configures the power control unit 704 to turn off power to different blocks or all gated power devices in the "gated power domain" at certain times for certain durations. While the UPC 602 is placed in idle mode, the ROM 606 and the static functions 702, for example, may not be necessary and if not, are powered down. At a first block 802, a loop is shown representing a condition of placing the UPC 602 into idle mode. An actual loop is not necessary, where block 802 generally represents any method of detecting a programmed or spontaneous idle mode, such as a received idle command, an idle timer, an interrupt, a predetermined idle condition, etc. The UPC 602 remains active during normal operation until an idle condition is detected. If the UPC 602 is to be placed in idle mode, then operation proceeds to block 804 at which the GCP signal is placed in static mode to freeze operation of the UPC 602. Operation proceeds to block 806 at which any other gated clock signals are placed in static mode to effectively freeze the corresponding units, such as the GCR1 and GCS signals for the ROM 606 and the static functions 702, respectively. Also, any one or more of the GCR2, GC1, GC2 and GCN signals may also be placed in static mode. It is noted that any of the gated clock signals may be placed in static mode in any order, although it may be desired to freeze the UPC 602 first before freezing any other devices on the IC 102 or vice-versa.

After the desired gated clock signals are placed in static mode, operation proceeds to next block 808 at which the power is removed from the ROM 606 and from the static functions 702. As described previously, this means that voltage (e.g., power) is removed from the GPR and GPS signals. In the embodiment shown, it is desired to power down the ROM 606 and the static functions 702 after the UPC 602 is place in idle mode. A significant amount of power is saved by preventing leakage current from the transistors comprising devices (e.g., memory arrays and static devices and the like) that do not need power while the UPC 602 is inactive.

Operation then proceeds to decision block 810 showing another loop representing whether to keep the UPC 602 in idle mode. Again, an actual loop is not necessary and block 810 generally represents any method of detecting a return to active mode, such as based on timers, interrupts, commands, etc. As long as it is desired to keep the UPC 602 in idle mode, operation remains at block 810. If and when it is desired to re-activate the UPC 602, operation proceeds to next block 812 at which power is applied to the ROM 606 and to the static functions 702 via the GPR and GPS signals, respectively. Operation then proceeds to next block 814 at which selected ones or all of the gated clock signals are placed in active mode. At next block 816, the GCP signal is placed in active mode to re-activate the UPC 602. It is noted that no particular order of activating the gated clock signals is necessary, although it may be desired to activate the UPC 602 last after the other devices on the IC 102 are activated to prevent the UPC 602 from accessing an idle device. In the embodiment shown, as indicated in the flowchart, it is desired to power up the ROM 606 and the static functions 702 prior to re-activating the UPC 602. Such ordering prevents the UPC 602 from accessing the ROM 606 prior to its power being restored. After block 816, operation proceeds back to block 802 to detect another idle condition.

In certain embodiments, when powering off individual blocks within a system where power continues to be supplied, it is desired that there be no current paths from the powered domain into the un-powered domain. For example, when power is removed from the ROM 606 and/or the static functions 702 in the "gated power domain", they become part of an "un-powered domain" whereas the remaining units in the "directly powered domain" are powered on. To prevent current from flowing into the un-powered domain from the powered domain, a low voltage or zero voltage level is applied to each of the inputs of un-powered devices in the un-powered domain to minimize or otherwise prevent current flow. The low or zero voltage level may correspond to a logic '0' state for positive logic or to a logic '1' state for negative logic as known to those skilled in the art. In addition, the outputs of the un-powered devices, which would otherwise be floating and in an unknown state, are instead clamped to a known logic state before propagating to other blocks of the IC.

Figure 9:
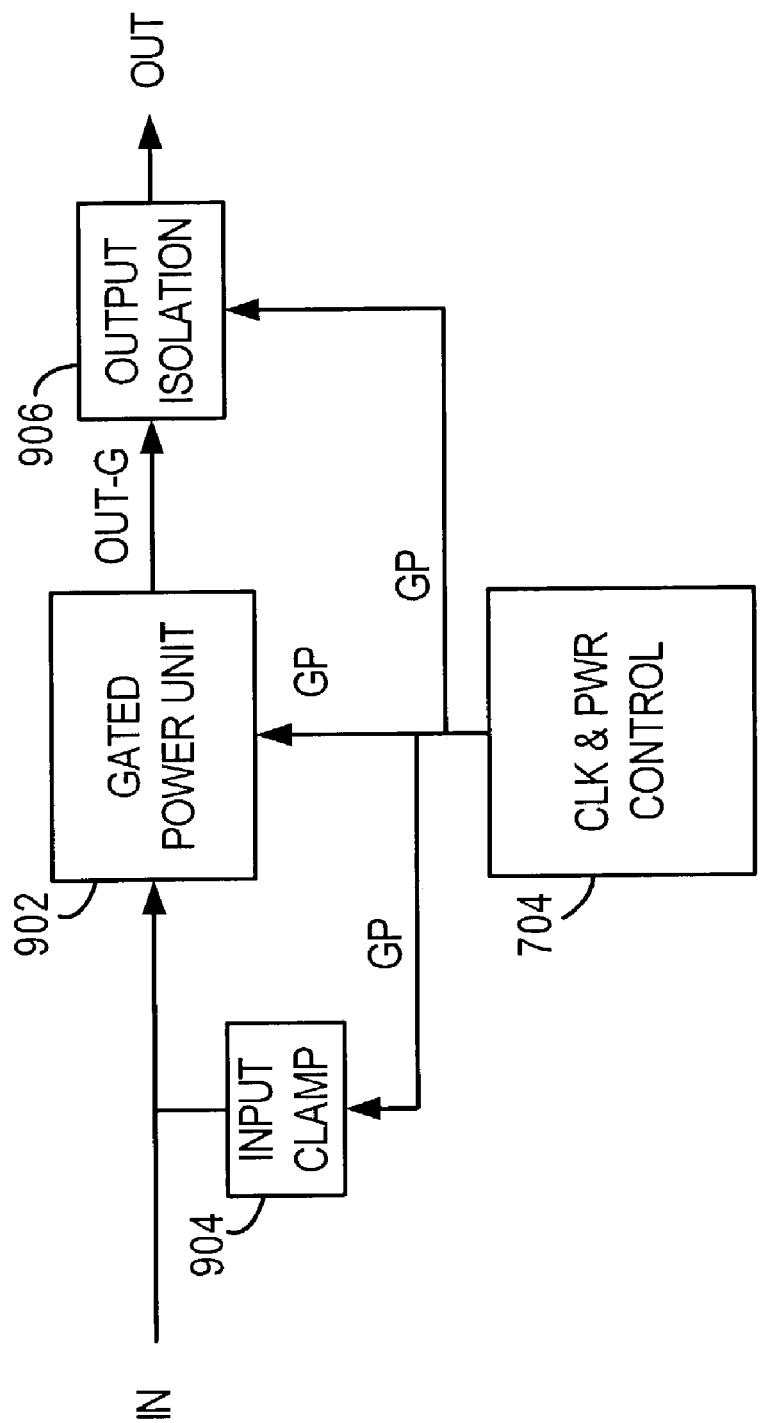
FIG. 9 is a more detailed block diagram illustrating isolation circuitry for clamping or otherwise isolating inputs and output signals of a gated power unit when powered down.

FIG. 9 is a more detailed block diagram illustrating isolation circuitry for clamping or otherwise isolating inputs and output signals of a gated power unit 902 when powered down. The gated power unit 902 represents any of the gated power devices provided on the IC 102, such as, for example, the ROM 606 and the static functions 702. The power control unit 704 is shown providing a gated power (GP) signal to the gated power unit 902, where the GP signal represents any of the gated power signals, such as, for example, the GPS signal (for static functions 702) or the GPR signal (for the ROM 606). An input (IN) signal is provided to a respective input of the gated power unit 902 and to an input of an input clamp circuit 904. The IN signal represents any input signal to the gated power unit 902 where it is understood that each input signal is treated in a similar manner, such as providing a similar input clamp circuit 904 for each input signal. The gated power unit 902 asserts an output signal (OUT-G) to an input of an output isolation circuit 906, which provides a corresponding output (OUT) signal. The OUT-G signal represents any output signal of the gated power unit 902, where it is understood that each output signal is treated in a similar manner, such as providing a similar output isolation circuit 909 for each output signal. The GP signal is provided to a control input of the input clamp circuit 904 and to a control input of the output isolation circuit 906.

In operation, when the power control unit 704 provides power to the gated power unit 902 via the GP signal during powered operation, then the input clamp circuit 904 is effectively off and does not affect the IN signal. In a similar manner, when the GP signal is asserted and providing power, the output isolation circuit 906 operates in transparent mode and either couples the OUT and OUT-G signals together or otherwise asserts the OUT signal to follow the OUT-G signal. For example, the OUT-G signal may be a buffered version of the OUT-G signal. When the power control unit 704 powers down the gated power unit 902 by negating the GP signal, the input clamp circuit 904 clamps the IN signal to a low or zero voltage level (e.g., logic '0') to prevent current from a powered device from flowing into the powered down unit 902. The output isolation circuit 906 isolates the OUT-G and OUT signals from each other to prevent or otherwise minimize current flow into the gated power unit 902 and clamps the OUT signal to a "known state" when the GP signal is negated. The "known state" is either a predetermined logic state, such as logic '0' or logic '1', or whatever state the signal was in at the moment of power down.

In one embodiment, the output isolation circuit 906 is a 2-input MUX with its first input receiving the OUT-G signal, its second input receiving a known logic signal, such as a static logic '0' level or logic '1' level, an output providing the OUT signal, and a select input receiving the GP signal. When GP is asserted, the OUT-G input is selected to the output for normal operation, and when the GP signal is negated, the static logic level is selected to the output for powered down mode. The MUX embodiment ensures a predetermined logic state during the powered down or idle state. In another embodiment, the output isolation circuit 906 is a "bus keeper" circuit that freezes the existing logic level of the OUT signal when the GP signal is negated to retain the logic state of the OUT signal at power down. In yet another embodiment, the output isolation circuit 906 is a clamp circuit substantially identical to the input clamp circuit 904 which clamps the OUT signal to a low or zero voltage level (e.g., logic '0') to minimize or otherwise eliminate current flow. It is appreciated that the input clamp circuit 904 and the output isolation circuit 906 effectively isolate powered devices from each gated powered device when powered down to prevent current from flowing into un-powered domain logic.

Embodiments according to the present invention are able to achieve lower power consumption by reducing or otherwise eliminating a significant amount of intrinsic leakage of current. The present invention is particular advantageous for ROM-based microprocessor designs in which the ROM is used to store processor code. In these designs, the ROM is powered down when the processor is idle thereby substantially reducing power consumption.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. An embedded processor system, comprising:
   at least one gated power unit;
   said at least one gated power unit including an embedded non-volatile memory array;
   a power controller, receiving power via a system power signal, that provides at least one gated power signal to selectively provide power to said at least one gated power unit;
   isolation circuitry coupled to at least one input and to at least one output of each of said at least one gated power unit that is operative to minimize current flow into each of said at least one gated power unit when powered down, wherein said isolation circuitry comprises:
   an input clamp circuit that selectively clamps said at least one input when said at least one gated power unit is powered down; and an output isolation circuit that selectively isolates said at least one output when said at least one gated power unit is powered down.

2. The embedded processor system of claim 1, wherein said non-volatile memory array comprises a read-only memory (ROM).

3. The embedded processor system of claim 1, further comprising:
   an embedded processor coupled to said non-volatile memory array; and
   said power controller receiving a system clock signal and providing a gated clock signal to said processor to selectively control power consumption of said processor.

4. The embedded processor system of claim 3, wherein said power controller performs a power down mode by first switching said gated clock signal to a static state to freeze said processor and then powering down each of said at least one gated power unit via said at least one gated power signal, and wherein said power controller performs a power up mode by first powering up each of said at least one gated power unit via said at least one gated power signal and then switching said gated clock signal to active to re-activate said processor.

5. The embedded processor system of claim 1, wherein said isolation circuitry is controlled by said at least one gated power signal.

6. The embedded processor system of claim 1, further comprising:
   said at least one gated power unit including at least one static function; and
   said power controller providing a first gated power signal to selectively provide power to said non-volatile memory array and providing a second gated power signal to selectively provide power to said at least one static function.

7. An embedded processor system, comprising:
   at least one gated power unit;
   said at least one gated power unit including an embedded non-volatile memory array;
   a power controller, receiving power via a system power signal, that provides at least one gated power signal to selectively provide power to said at least one gated power unit;
   isolation circuitry coupled to at least one input and to at least one output of each of said at least one gated power unit that is operative to minimize current flow into each of said at least one gated power unit when powered down, wherein said isolation circuitry comprises:
   an input clamp circuit that selectively clamps said at least one input when said at least one gated power unit is powered down; and an output isolation circuit that selectively isolates said at least one output when said at least one gated power unit is powered down, wherein said output isolation circuit clamps a corresponding output signal to a known logic state when said at least one gated power unit is powered down.

8. The embedded processor system of claim 7, wherein said non-volatile memory array comprises a read-only memory (ROM).

9. The embedded processor system of claim 7, further comprising:
   an embedded processor coupled to said non-volatile memory array; and
   said power controller receiving a system clock signal and providing a gated clock signal to said processor to selectively control power consumption of said processor.

10. The embedded processor system of claim 9, wherein said power controller performs a power down mode by first switching said gated clock signal to a static state to freeze said processor and then powering down each of said at least one gated power unit via said at least one gated power signal, and wherein said power controller performs a power up mode by first powering up each of said at least one gated power unit via said at least one gated power signal and then switching said gated clock signal to active to re-activate said processor.

11. The embedded processor system of claim 7, wherein said isolation circuitry is controlled by said at least one gated power signal.

12. The embedded processor system of claim 7, further comprising:
    said at least one gated power unit including at least one static function; and
    said power controller providing a first gated power signal to selectively provide power to said non-volatile memory array and providing a second gated power signal to selectively provide power to said at least one static function.

13. An integrated circuit, comprising:
    an embedded microprocessor;
    a read-only memory (ROM) coupled to said embedded microprocessor, said ROM having a power input;
    a power control unit, receiving power via a system voltage signal, that provides a gated power signal to said power input of said ROM to selectively power up and power down said ROM; and
    isolation circuitry coupled to inputs and outputs of said ROM that minimizes current flow into said ROM when powered down;
    wherein said isolation circuitry comprises:
    at least one input clamp, each coupled to a corresponding input of said ROM, each input clamp clamping said corresponding input to minimize current flow when said ROM is powered down; and
    at least one output isolation circuit, each coupled to a corresponding output of said ROM, each output isolation circuit isolating said corresponding output from powered devices when said ROM is powered down.

14. The integrated circuit of claim 13, further comprising:
    said power control unit receiving a system clock signal and providing a gated clock signal to said microprocessor; and
    said power control unit reducing power by placing said gated clock signal into a static state to place said microprocessor in idle mode and powering down said ROM by removing power from said gated power signal.

15. The integrated circuit of claim 14, wherein said power control unit reactivates said microprocessor by first powering up said ROM by applying power to said gated power signal and then placing said gated clock signal to an active state.

16. The integrated circuit of claim 13, further comprising:
    at least one static function having a power input; and
    said power control unit providing a second gated power signal to said power input of said at least one static function to selectively power up and power down said at least one static function.

17. The integrated circuit of claim 13, wherein said isolation circuitry is controlled by said gated power signal.

* * * * *